United States Patent [19]

Adelaar

[11] 4,046,963

[45] Sept. 6, 1977

[54] TIMES SLOT SWITCHING

[75] Inventor: Hans Helmut Adelaar, The Hague, Netherlands

[73] Assignee: International Standard Electric Corporation, New York, N.Y.

[21] Appl. No.: 656,221

[22] Filed: Feb. 9, 1976

[30] Foreign Application Priority Data

Feb. 13, 1975 France .............................. 75.04438

[51] Int. Cl.² ............................................. H04J 3/04
[52] U.S. Cl. ............................ 179/15 A; 179/15 BV
[58] Field of Search .......... 179/15 A, 15 AQ, 15 AT, 179/15 BA, 15 BV

[56] References Cited

U.S. PATENT DOCUMENTS

| 3,688,049 | 8/1972 | Schlichtz | 179/15 AQ |
| 3,790,715 | 2/1974 | Inose | 179/15 BA |
| 3,794,768 | 2/1974 | Carney | 179/15 BV |

Primary Examiner—David L. Stewart
Attorney, Agent, or Firm—James B. Raden; William J. Michals

[57] ABSTRACT

A time slot association arrangement for a high quality connection in a time multiplex system. An input time slot reserved for high quality lines is associated with an output time slot. Samples written in the "In" slot are read during the "Out" slots in the order in which they were entered. The quality slots are detected and the reference code is incremented by one on an "Out" slot, and the code on an "In" slot is decreased by one. As the next step, the output slot providing maximum results is identified and associated with the input time slots following the maximum result output slot.

5 Claims, 4 Drawing Figures

TIMES SLOT SWITCHING

This invention concerns a time slot association device permitting high quality connections to be established between subscribers connected to a time switching network.

In a time switching network, analog signals coming from subscriber's lines are sampled and coded by means of eight-bit words for example. A sampling period of 125 μs is commonly, although not necessarily, used. Then the coded samples relating to several subscribers, 32 for example, are time-multiplexed and transmitted to a switching center over the same multiplex line. Therefore, each multiplex line successively transmits 32 coded samples during one repetition period or frame, each of the samples occupying a particular time slot, or time channel, within a frame. A single sample of the analog signal relating to each subscriber is therefore transmitted during one frame and the relatively low sampling frequency (8 kHz) limits the bandwidth of the analog signal reconstituted upon arrival. This bandwidth limitation is of no consequence in the case of conventional telephone conversations, but a wider bandwidth must be provided if a loud speaker is to be utilized with the subscriber's set or for the transmission of musical programs or language courses, for example.

One known solution for improving the transmission bandwidth of some communications between subscribers connected to a time switching network consists in using several time slots within the same frame for each of these communications with uniform time spacing between each of these time slots. This solution involves multiplying by a whole number the base sampling frequency (8 kHz) of the analog signals of the subscribers in question. Thus, a sampling frequency of 16 kHz requires the use of two time slots within the same frame. From here on a connection between two subscribers using several time slots within the same frame will be called a high quality connection. Several classes of high quality connections can be defined as a function of the number of time slots used for each of them.

A time switching center includes data storages for establishing links from time channel to time channel and space switching elements establishing links from multiplex line to multiplex line. During a coventional connection between two subscribers, the link between the two corresponding time channels is established by means of data storages by reading the sample in question during a time slot usually different from the writing time slot. The different samples stored in the data storages, relating to the different conventional connections made, can be read with no problem in an order different from the one in which they were entered.

During a high quality connection between two subscribers, the different samples of the same frame relating to this connection are read, as before, in the data storages during time slots generally different from those of the writing, but the order in which they are read must be identical to the writing order in order to be able to reconstitute, when received, the same analog signal as the one which was transmitted. The elapsed time between two successive time slots of such a connection can be different at the output of the data storages from the one at the input, the initial time relation between the different time slots used for this high quality connection then being reconstituted in the receiver concentrator.

The specific object of this invention is a time slot association device permitting the samples of a high quality connection stored in a data storage to be read out in the same order as that in which they were written.

The invention provides for a time slot association device for the establishment of a high quality connection between two subscribers utilizing several time slots within the same frame in a time switching network, designed to associate with each input time slot $x$ of each data storage reserved for the said high quality connection an output time slot $y$ from among the available output time slots such that the samples written in the data storages during these input time slots $x$ are read during the output time slots $y$ according to the order in which they were entered, characterized in that it includes first means to detect the said input time slots $x$ and output time slots $y$ reserved for the said high quality connection according to their chronological order within a frame, second means to increase by one step a binary reference code $m$ when the said first means of detection detect an output time slot $y$ and to decrease by one step the said binary code when they detect an imput time slot $x$, third means to identify the or one of the output time slots $y$ corresponding to the maximum result obtained during the different increasings, and fourth means to associate the successive output time slots following the said output time slot corresponding to the maximum result respectively with the successive input time slots following this same output time slot.

Other objects, characteristics and advantages of this invention will be brought out in the following description of an embodiment and attached drawings in which:

FIG. 1 represents the block diagram of a time switching center containing the time slot association device according to the invention.

Figure 1:
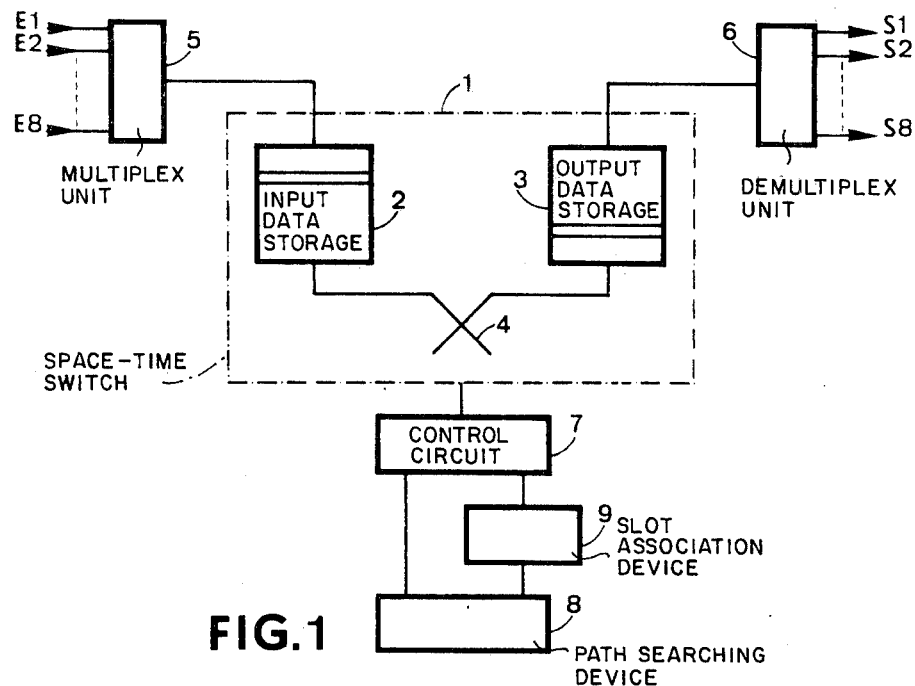
FIG. 1 shows a block diagram of a time switching center containing the time slot association device according to the invention.

This switching center includes a space-time switch 1 whose configuration is for example of the type TST (time-space-time). We have shown in FIG. 1, for more clarity, only one input data storage 2 and one output data storage 3 providing the time switching, connected by a crosspoint 4 performing the space switching, this arrangement establishing communications in only one direction from left to right. The input data storage 2 receives successively in time, through a multiplexing unit 5, the coded samples coming from eight incoming multiplex lines E1 to E8, each of these eight incoming multiplex lines transmitting 32 coded samples during 32 time slots within a frame of 125 μs. This input data storage 2 contains therefore 32 × 8 = 256 lines and can enter 256 samples during 256 time slots within a frame of 125 μs. The output data storage 3 likewise includes 256 lines. Since writing and reading of the data storages cannot occur simultaneously, it is assumed that the writing operations are carried out during the second half of these time slots. A demultiplexing unit 6 receives the samples read in the output data storage 3 and distributes them among eight outgoing multiplex lines S1 to S8. From here on, we shall consider for each coded sample stored on a line of a data storage one input time slot, corresponding to the time slot during which the sample is entered, and one output time slot, corresponding to the time slot during which this sample is read. The digital values considered (eight multiplex lines of thirty-two time channels each) have been chosen as an example, but other values are possible.

A control circuit 7 controls the data storages 2 and 3 as well as the crosspoint 4 by orders received either directly from a path searching device 8 in the case of conventional connections with a single time slot, or by means of the time slot association device 9 according to the invention in the case of high quality connections with several time slots.

Figure 2:
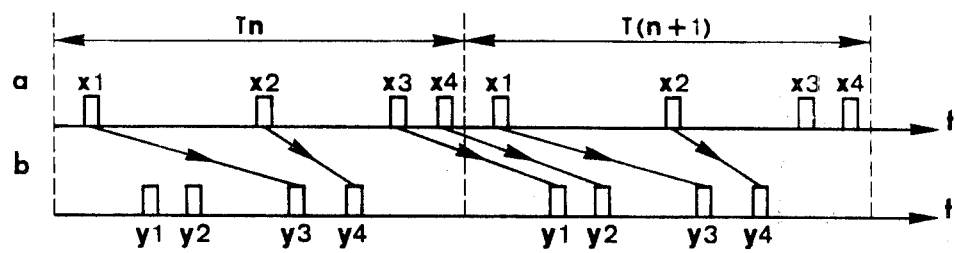
FIGS. 2 and 3 represent diagrams of time slots used in a high quality connection.

We shall now explain, with reference to FIGS. 1 and 2, the function and operating principle of the time slot association device 9 used to establish a high quality connection. As an example, we shall consider its operation in relation to the input data storage 2, with the understanding of course that it is used for each of the data storages of the space-time switch 1. FIG. 2a shows four input time slots $x1$, $x2$, $x3$ and $x4$ corresponding to the four time slots during which four coded samples $i$, $j$, $k$, $l$ of a high quality connection are entered in the data storage 2. The input time slots $x1$, $x2$, $x3$ and $x4$ as well as the coded samples $i$, $j$, $k$ and $l$ follow one another within successive frames $Tn$, $T(n+l)$, ..., according to the order in which they were enumerated Thus, samples $i$, $j$, $k$, $l$ are entered respectively in data storage 2 during the time slots $x1$, $x2$, $x3$ and $x4$.

The time slot association device 9 is informed of the position of these four input slots by signalling means not shown. The path searching device 8 then detects in the conventional way four free output time slots $y1$, $y2$, $y3$ and $y4$ among the 32 output time slots of one of the eight multiplex lines, these four output time slots shown in FIG. 2b following one another in the order in which they were enumerated.

For each of the four samples $i$, $j$, $k$ and $l$ stored in the data storage 2, must associate an output time slot $y$ with an input time slot $x$ in such a way that the four samples are read in the same order as the one in which they were entered, but care must also be taken so that each $x$, $y$ association is such that the output time slot $y$ is not present earlier in time than the input time slot $x$ with which it is associated so that the corresponding sample has the time to be entered before being read, and that the elapsed time between the input time slot $x$ and the associated output time slot $y$ is not greater than the length of one frame.

Taking these conditions into account, and referring to the configuration shown in FIG. 2, only two groups of time slot association (groups 3 and 4) are correct among the following four groups:

| Group 1 | Group 2 |
|---------|---------|
| x1, y1  | x1, y2  |
| x2, y2  | x2, y3  |
| x3, y3  | x3, y4  |
| x4, y4  | x4, y1  |
| Group 3 | Group 4 |
| x1, y3  | x1, y4  |
| x2, y4  | x2, y1  |
| x3, y1  | x3, y2  |
| x4, y2  | x4, y3  |

The arrows joining the input and output time slots shown in FIG. 2 symbolize the associations of group 3. We note that in all cases, there is at least one correct group of time slot association. The purpose of the time slot association device according to the invention is to determine such an association group permitting the correct establishment of a high quality connection.

Figure 3:
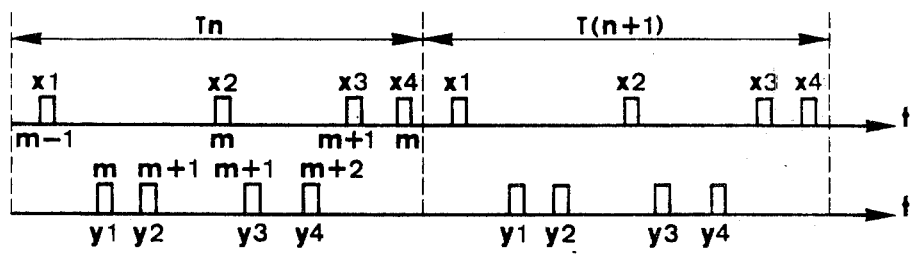

The principle of determination of a correct group of time slot association will be better understood with the help of FIG. 3 showing the same input time slots $x1$ to $x4$ and output time slots $y1$ to $y4$ as those in FIG. 2. The 256 time slots contained in one frame are successively scanned in their chronological order, this operation being done after having taken care beforehand to determine a binary reference $m$ which can be for example a given binary number or the position of a 1 bit within a binary word including several 0 bits and this single 1 bit. This binary reference is increased by one step each time an output time slot $y$ is encountered during the scanning whereas it is decreased by one step each time an input time slot $x$ is encountered. Thus, referring to FIG. 3, the binary reference $m$ is decreased by one step by the detection of the input time slot $x1$, then increased by one step by the detection of the output time slot $y1$, then again increased by one step by the detection of $y2$, etc. .. We can draw up the following table indicating on the one hand the different input and output time slots $x$ and $y$ detected during the scanning in the case of configuration shown in FIG. 3, with the time slots $x$ and $y$ being accompanied by the signs − and + respectively in order to determine the direction of variation of the reference signal $m$, and on the other hand the value of the result corresponding to each time slot detected:

| Time slots | Sign | Result |
|------------|------|--------|
| nil        | nil  | m      |
| x1         | −    | m − 1  |
| y1         | +    | m      |
| y2         | +    | m + 1  |
| x2         | −    | m      |
| y3         | +    | m + 1  |
| y4         | +    | m + 2  |
| x3         | −    | m + 1  |
| x4         | −    | m      |

Once the scanning operation is finished, a correct group of time slot association is determined by associating the output time slot $y$ corresponding to the maximum value of the result obtained with the input time slot $x$ immediately preceding it in time, the following output time slots being associated with the following input time slots respectively. Thus, in the table, the maximum value of the result is $m + 2$ and the corresponding output time slot is $y4$. This output time slot $y4$ will therefore be associated with the input time slot $x2$ immediately preceding it. Then $y1$ will be associated with $x3$, $y2$ with $x4$ and $y3$ with $x1$. These are the group 3 associations shown in FIG. 2.

In certain cases, there may be several output time slots $y$ corresponding to the maximum value of the result. A correct group of associations can then be determined from any one of these output time slots, by associating it with the input time slot immediately preceding it.

The principle of determining a correct time slot association group has been described in relation to an example of a high quality connection having four time slots per frame. It can be applied to any class of high quality connections having more of fewer than four time slots.

Figure 4:
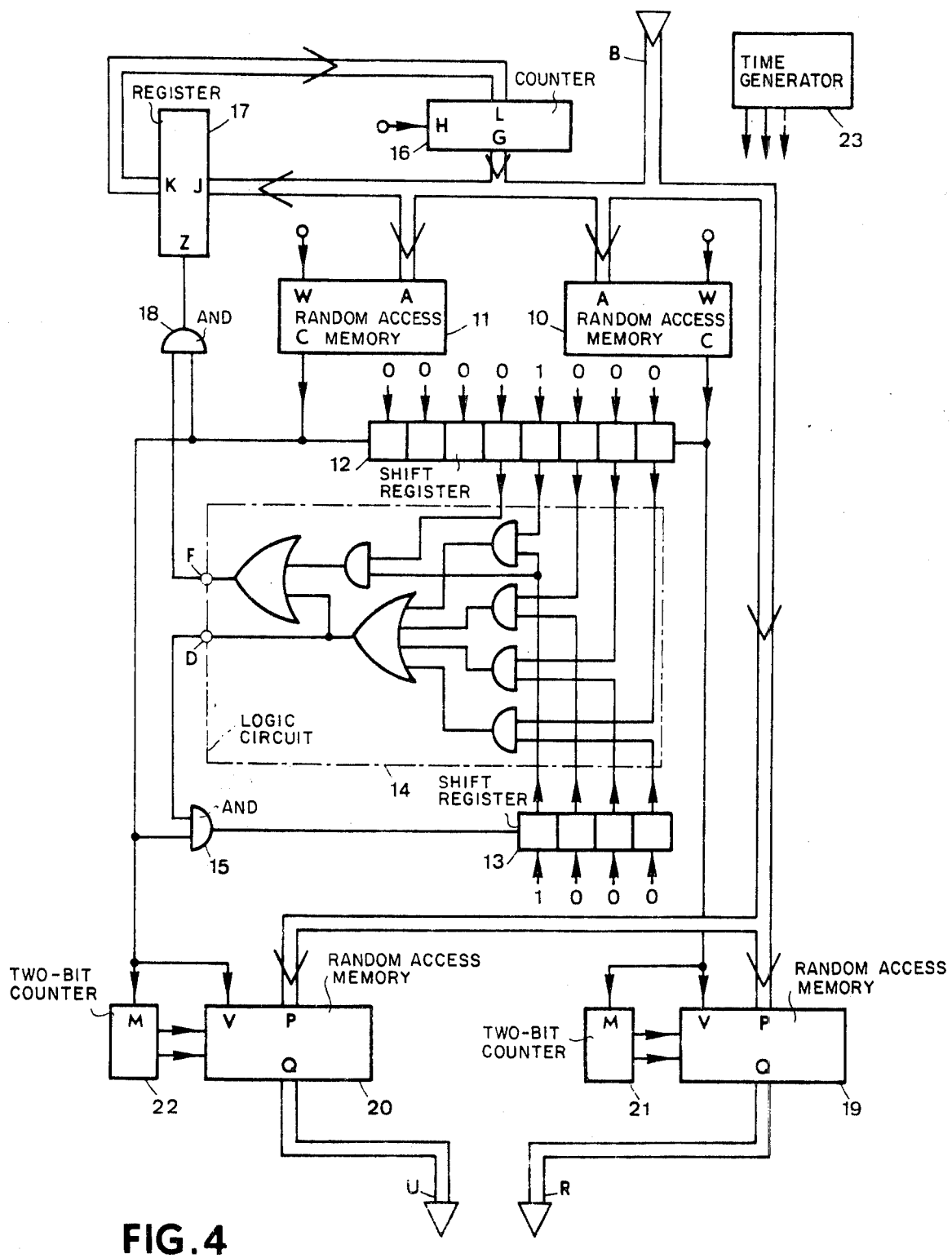
FIG. 4 shows the block diagram of an embodiment of the time slot association device according to the invention.

FIG. 4 shows a block diagram of an embodiment of the time slot association device according to the invention designed for high quality connections using four time slots. Of course the operating principle of this device is applicable to other classes of high quality connections having more or fewer than four time slots.

It contains two random access memories 10 and 11 each including 256 one-bit lines, memory 10 being designed to store the position of the four input time slots $x1$ to $x4$ within a frame while memory 11 is designed to store the position of the four output time slots $y1$ to $y4$. Eight inputs A for the addressing of memories 10 and 11 are connected to the path searching device (not shown) of the switching center by means of eight conductors B. Both of these memories have a single data input W. The single outputs C of memories 10 and 11 are respectively connected to the left-shift input and to the right-shift input of an eight-bit bidirectional shift register 12 having parallel presetting inputs and parallel outputs. The five parallel outputs of the last five cells to the right of this shift register 12 and the four parallel outputs of a four-bit right-shift register 13 having parallel presetting inputs are connected to a logic circuit 14 with two outputs D and F such that the output D delivers a 1 bit when two homologous outputs from the right of shift registers 12 and 13 simultaneously deliver a 1 bit and the output F delivers a 1 bit either when output D delivers a 1 bit, or when the fifth output from the right of shift register 12 and the fourth output from the right of shift register 13 simultaneously deliver a 1 bit. The right-shift input of the shift register 13 is connected to the output C of the time slot memory 11 through an AND-gate 15 triggered when output D of the logic circuit 14 delivers a 1 bit. The eight binary outputs G of an eight-bit counter 16 having a clock input H are connected on the one hand to the address inputs A of the time slot memories 10 and 11, and on the other hand to the eight inputs J of a register 17 whose eight outputs K are connected to eight presetting inputs L of the counter 16. A trigger input Z of the register 17 is connected to output C of memory 11 through an AND-gate 18 triggered when the output F of logic circuit 14 delivers a 1 bit.

Two random access memories 19 and 20 each having four eight-bit lines are addressed respectively by two two-bit counters 21 and 22, the counting input M of the first being connected to output C of memory 10 while that of the second is connected to output C of memory 11. The eight data inputs P of each of the memories 19 and 20 are connected to the eight outputs G of counter 16, while the eight outputs Q are connected to the control circuit 7 of FIG. 1 by means of conductors R and U. The writing authorization inputs V of memories 19 and 20 are connected respectively to outputs C of memories 10 and 11.

A time generator 23 controls the operations of reading, writing, inhibiting, resetting to zero, presetting, etc ..., required for the correct operation of the arrangement of components described above.

The operation of the device shown in FIG. 4 is divided into four phases.

During the first phase, the eight-bit codes identifying the input time slots $x1$ to $x4$ address memory 10 through conductors B and addressing inputs $a$, the data input W receiving a 1 bit while a writing order is transmitted from the time generator 23. Four 1 bits are therefore written in memory 10, in the locations corresponding to the position of the four input time slots $x1$ to $x4$ within a frame. A similar operation is then carried out in memory 11, to enter four 1 bits in the locations corresponding to the position of the four output time slots $y1$ to $y4$ which are to be associated with the input time slots $x1$ to $x4$. The shift registers 12 and 13 are preset to 00001000 and 1000 respectively while register 17 is reset to zero, the binary word 00001000 corresponding to the reference $m$.

During the second phase, memories 10 and 11 are read successively at all their addresses, these being obtained on the outputs G of counter 16 initially reset to zero through its inputs L then receiving at its input H 256 clock pulses. Each time the address present at the inputs A of memory 10 corresponds to the position of one of the input time slots $x1$ to $x4$ within a frame, a 1 bit is present at the output C and consequently at the output C and consequently at the left-shift input of shift register 12, which has the effect of shifting one position to the left the 1 bit present in the reference binary word 00001000. Each time the address present on the inputs A of memory 11 corresponds to the position of one of the output time slots $y1$ to $y4$, a 1 bit is present at the output C and consequently at the right-shift input of shift register 12, which causes a shift of one position to the right in this register. In order to never have two 1 bits simultaneously on the two shift inputs of the shift register 12, the reading orders of these two memories are shifted in time, each line of memory 11 being read after the homologous line of memory 10.

When a 1 bit is present simultaneously at the outputs of two homologous cells of the shift register 13 and the positive part formed by the four right-hand cells of shift register 12, a 1 bit is present at the outputs D and F of the logic circuit 14 and triggers the AND-gates 15 and 18, permitting then on the one hand the content of shift register 13 to be shifted by one position to the right upon the presence of the next shifting 1 bit of register 12 if this bit comes from output C of memory 11, and permitting on the other hand the address corresponding to the position of this 1 bit in memory 11 and present at the inputs J of register 17 to be written in this register. Thus, all during the reading of memories 10 and 11 corresponding to the scanning of time slots contained in a frame, the output time slot $y$ corresponding to the maximum shift to the right encountered until then in the shift register 12 is stored in register 17. At the end of the reading of memories 10 and 11, register 17 will contain the output time slot $y$ corresponding to the maximum shift to the right encountered during the scanning of a complete frame.

There exist configurations of time slots $x$ and $y$ within a frame such that the 1 bit contained in the reference binary word 00001000 does not advance beyond its initial position in the shift register 12. In such cases, it is the output time slot $y$ corresponding to this initial position which must be stored in register 17. For this purpose, the output F delivers a 1 bit when there is simultaneously a 1 bit at the output of the first cell from the left of shift register 13 and at the output of the fourth cell from the left of shift register 12. If then memory 11 delivers a 1 bit at its output C, the 1 bit present at the output of the fourth cell from the left of shift register 12 will be shifted by one step to the right, and the address present at the inputs A of memory 11 will be stored in register 17. The address present in register 17 at the end of the scanning corresponds to the address of the last 1 bit read in memory 11.

During the third phase, counter 16 is preset, by means of its eight inputs L, to the address of the time slot $y$ present at the end of the preceding phase at the outputs K of register 17. Then it receives two hundred and fifty-six clock pulses at its input H, which permit it to deliver successively at its outputs G the 256 time slot addresses contained within a frame, beginning with the time slot immediately following the output time slot $y$ present in register 17. Thus counter 16 addresses the 256 lines of memories 10 and 11, which have received a reading order from the time generator 23. Every time a 1 bit is present at output C of memory 10, the counter 21 advances by one step by means of its input M and memory 19 receives a writing order through its input V, thus permitting the address of the input time slot at the output of counter 16 to be written on a line of memory 19. The same is true for counter 22 and memory 20 when a 1 bit is present at the output C of memory 11. Thus, taking the example of associations shown in FIG. 2, we shall find on the first line of memory 19 the address of the input time slot $x3$, then on the other three lines respectively the address of the following other three input time slots $x4$, $x1$ and $x2$. The four lines of memory 20 will contain the addresses of the output time slots $y1$, $y2$, $y3$ and $y4$ respectively.

A correct time slot association group is then obtained by associating each output time slot present on a line of memory 20 with the input time slot present on the corresponding line of memory 19. The fourth phase consists consequently in simultaneously reading the homologous lines of memories 19 and 20, with counters 21 and 22 delivering successively the addresses of the four lines of these memories under the control of clock pulses coming from the time generator 23. Conductors U and R therefore deliver successively in time the four $x$, $y$ associations permitting the control circuit of the switching center to establish a high quality connection.

Although this invention has been described in connection with a particular embodiment, it is clearly not limited to the said example and is capable of other variants or modifications still within its scope.

I claim:

1. A time slot association device for the establishment of a high quality connection between two subscribers utilizing several time slots within the same frame in a time switching network, said device being designed to associate with each input time slot $x$ of each data storage reserved for said high quality connection an output time slot $y$ from among the available output time slots such that the samples written in the data storages during these input time slots $x$ are read during the output time slots $y$ according to the order in which they were entered, said device including first means for detecting said input time slots $x$ and output time slots $y$ reserved for said high quality connection according to their chronological order within a frame, second means coupled to said first means to increase by one step a binary reference code $m$ when said first means detects an output time slot $y$ and to decrease by one step said binary code when an input time slot $x$ is detected, third means coupled to said second means to identify one of the output time slots $y$ corresponding to the maximum result obtained during the different increasings, and fourth means coupled to said first and third means to associate one of said time slots $y$ corresponding to the maximum result respectively with the immediately preceding input time slot $x$ of the high quality connection.

2. A time slot association device according to claim 1, wherein said first means for detecting the input time slots $x$ and output time slots $y$ includes two identical random access memories each having as many one-bit lines as there are time slots within a frame, said two memories presenting a 1 bit on the lines whose addresses correspond respectively to the position of the input time slots $x$ and to the position of the output time slots $y$ within a frame, and means for reading successive lines from said two memories.

3. A time slot association device according to claim 2, wherein said second means to increase or decrease the binary reference code $m$ includes bidirectional shift register whose left-shift input is connected to the output of the first of said two random access memories and whose right-shift input is connected to the output of the second memory.

4. A time slot association device according to claim 3, wherein said third means to identify one of the output time slots $y$ corresponding to the maximum result obtained during the different increasings includes a logic circuit triggering the inputs of a register when the right shift obtained in said bidirectional shift register is equal to the maximum shift obtained until then.

5. A time slot device according to claim 4, wherein said fourth means of association include two additional random access memories each having as many lines as there are time slots reserved for said high quality connection, said two additional memories storing on their different lines respectively the address of the output time slots $y$ starting with the one immediately following the output time slot corresponding to the maximum result obtained during the different increasings and the address of the input time slots $x$ starting with the one immediately following the said output time slot corresponding to the maximum result, and means for simultaneously reading the homologous lines of said two additional memories.

* * * * *